United States Patent
Ferro

(10) Patent No.: US 8,154,212 B2
(45) Date of Patent: Apr. 10, 2012

(54) CIRCUIT FOR DRIVING LIGHT SOURCES AND RELATED METHOD

(75) Inventor: Alberto Ferro, San Bonifacio (IT)

(73) Assignee: OSRAM AG, München (DE)

(*) Notice: Subject to any disclaimer, the term of this patent is extended or adjusted under 35 U.S.C. 154(b) by 243 days.

(21) Appl. No.: 12/513,477

(22) PCT Filed: Nov. 3, 2006

(86) PCT No.: PCT/IT2006/000765
§ 371 (c)(1),
(2), (4) Date: May 4, 2009

(87) PCT Pub. No.: WO2008/053501
PCT Pub. Date: May 8, 2008

(65) Prior Publication Data
US 2010/0060192 A1 Mar. 11, 2010

(51) Int. Cl.
*H05B 41/36* (2006.01)
(52) U.S. Cl. .............. 315/209 R; 315/211; 315/212; 315/216; 315/291
(58) Field of Classification Search .............. None
See application file for complete search history.

(56) References Cited

U.S. PATENT DOCUMENTS

| 4,949,066 A * | 8/1990 | Reinhardt | 73/25.05 |
| 5,661,645 A * | 8/1997 | Hochstein | 363/89 |
| 2005/0269956 A1* | 12/2005 | Joos | 315/86 |

FOREIGN PATENT DOCUMENTS

DE 37 17 260 12/1988

* cited by examiner

*Primary Examiner* — Anh Tran
(74) *Attorney, Agent, or Firm* — Cozen O'Connor

(57) ABSTRACT

A circuit for supplying a light source (L) such as a high flux (HF) LED with Pulse Width Modulation (PWM) dimming capability includes: a rectifier (10) for receiving an input bipolar PWM modulated signal (v) representative of a desired dimming level for the light source (L) and produce therefrom a rectified signal; a current regulator (14) to receive the rectified signal and produce therefrom a supply current for the light source (L); and a control module (16) sensitive to the input bipolar PWM modulated signal (v) to control the current regulator (14) to produce a PWM modulated supply current for the light source (L); and a capacitor (18) arranged between the rectifier (10) and the current regulator (14) to stabilize the rectified signal. The circuit typically includes ancillary circuitry (12), such as a microcontroller, connected to the capacitor to be supplied with the rectified signal as stabilized by the capacitor (18). The ancillary circuitry (12) is thus supplied irrespective of the dimming level associated with the input bipolar PWM modulated signal.

13 Claims, 2 Drawing Sheets

CIRCUIT FOR DRIVING LIGHT SOURCES AND RELATED METHOD

RELATED APPLICATIONS

This is a U.S. national stage of application No. PCT/IT2006/000765, filed on Nov .3, 2006.

FIELD OF THE INVENTION

The present invention relates to driving arrangements for light sources with dimming capability. The invention was developed by paying specific attention to its possible use in driving high flux light emitting diodes (HF LEDs) which are increasingly used as light sources.

BACKGROUND OF THE INVENTION

High flux constant voltage LED modules can be driven with 2-wire Pulse Width Modulation (PWM) dimmers by resorting to either of two basic arrangements.

In a first arrangement, a PWM input voltage is imposed directly on the power line. The LED or LEDs are turned on only when the voltage is higher than a certain threshold, otherwise they are off. Resorting to this arrangement makes it impossible to supply any ancillary circuitry (such as logic circuitry, e.g. a microcontroller for power-line communications) provided in the module if the dimming level is very low. Additionally, state-of-the art high flux LED modules typically include a step-up or step-down converter. These converters require huge capacitors at the input side for stability and filtering reasons. Consequently, if the module discharges these capacitors during the low input voltage period, when the input voltage goes high, a high current spike is produced on the power line. The possibility of dimming such LED modules with a direct PWM modulation of the input voltage has been so far restricted to limiting the input current, thus decreasing the performance at low dimming levels, or to avoiding the low dimming condition.

In an alternative arrangement, the power line and the PWM signal are separated and are carried by different wires. In that case, the PWM signal is transmitted on a third wire, while a controller in the module provides the PWM output current to the LEDs accordingly to such signal. In this way, ancillary control circuitry in the module can be supplied also at low dimming levels, at the cost of a more complex wiring.

OBJECT AND SUMMARY OF THE INVENTION

One object of the present invention is to provide arrangements suited for driving high flux constant voltage LED modules with 2-wire dimmers without giving rise to high peak input currents while also ensuring that power to supply ancillary circuitry in the module is available also at very low dimming levels.

In brief, in the arrangement described herein, the input voltage of the PWM dimmer is bipolar, with the two opposite values with the same absolute magnitude. A bridge rectifier is inserted in the LED module before a capacitor. In that way, the voltage across the capacitor is quite constant and the peaks in the input current peaks are reduced. Preferably, an "intelligent" controller in the module sets the output current to a fixed value when the input voltage is positive, and turns off the LEDs when the input voltage is negative.

In that way, the ancillary circuits in the module are powered also at very low dimming levels, avoiding a more complex wiring. Additionally, the bipolar PWM dimmer is compatible with conventional constant voltage LED modules, where a negative input voltage simply causes the LED to be switched off.

DETAILED DESCRIPTION OF AN EXEMPLARY EMBODIMENT

The detailed description provided herein relates, by way of example, to driving (i.e. supplying) a module including one or more high-flux LEDs L used as lighting sources. Specifically, the LED or LEDs are subjected to PWM dimming via their power line, by maintaining a supply voltage for ancillary logic circuitry associated with the LED or LEDs also at zero dimming level. This result is achieved by minimizing current spikes on the power line within the framework of a dimmer arrangement compatible also with conventional constant voltage LED modules.

Figure 1:
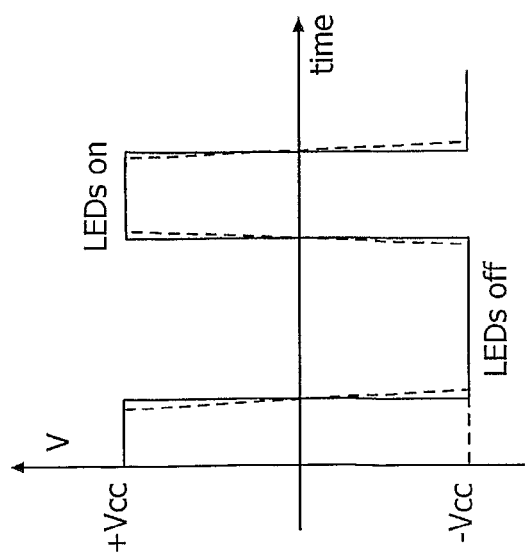
FIG. 1 is representative of the time behavior of a signal produced in operation of the arrangement described herein.

The dimmable LED module can be supplied with a PWM-modulated bipolar voltage as schematically shown in FIG. 1.

This is essentially a square wave voltage assuming alternatively a positive value $+V_{cc}$ or a negative value $-V_{cc}$ (i.e. a signal having the same magnitude or module $|V_{cc}|$ and opposite signs in the two cases). In general terms, the LED or LEDs in FIG. 2 will be assumed to be "on" and "off" when the voltage v is equal to $+V_{cc}$ and $-V_{cc}$, respectively. The dashed lines in FIG. 1 are representative of the fact that the time behavior of the signal v will not be a "perfect" square wave, but will exhibit rise and fall times of a finite duration.

It will be appreciated that such a signal is per se adapted to feed a conventional LED module with linear current regulators, as the LEDs of such a module will be turned on when the voltage v is positive (on-time), and switched off when the voltage v is negative (off-time).

Figure 2:
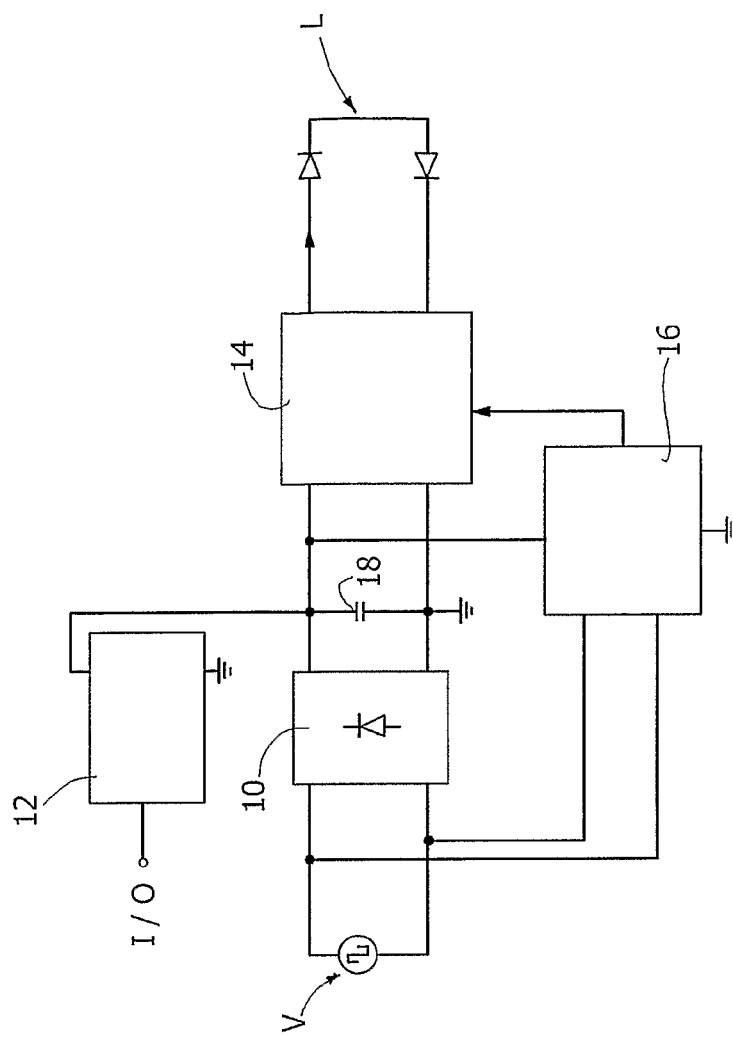
FIG. 2 is a block diagram representative of an embodiment of the arrangement described herein.

The block diagram of FIG. 2 is representative of a high flux LED module according to the arrangement described herein, which is adapted to receive as an input drive signal a PWM bipolar voltage signal v as schematically shown in FIG. 1.

In the block diagram of FIG. 2, the reference 10 denotes a full-bridge (FB) rectifier that is intended to drive the LED or LEDs while simultaneously supplying logic circuitry (e.g. a microcontroller) 12 associated therewith. While the LED or LEDs will be driven (i.e. supplied and thus "on") during the on-time only, power supply of the logic circuitry 12 will be ensured throughout operation of the arrangement illustrated.

A current regulator 14 (of a known type, thus making it unnecessary to provide a detailed description herein) will generate the PWM output current according to a PWM bipolar input voltage produced by a dedicated control circuit 16 (again of a known type) that causes the regulator 14 to produce an on-off output current, namely a current with an intensity equal to the rated value during the on-time and equal to zero during the off-time. The control circuit 16 is fed by and is thus sensitive to the bipolar input voltage v. The control circuit 16 also senses the current signal output from the rectifier 10 and controls the regulator 14 accordingly.

An input capacitor 18 is arranged across the feed lines from the rectifier 10 to the circuitry 12 and the current regulator 14.

The voltage on the input capacitor 16 is quite constant during the overall period, so that any peaks in the input current are reduced to a low level that depends on the (finite length) rise/fall times of the PWM input voltage. Power supply of the logic circuitry 12 is thus be ensured throughout operation of the arrangement illustrated irrespective of the dimming level imposed via the voltage v, i.e. also at very low dimming levels.

It will be appreciated that the arrangement illustrated makes it possible to render the input terminals of the LED module (i.e. the output terminals of the current regulator 14) "touchable". In fact, the maximum absolute value of the input voltage can be set to a value such that the rated RMS voltage is below the 25 V limit. This is in compliance with regulations such as EN 61347-2-13, while maintaining full compatibility with conventional 24 V LED modules.

Figure 3:
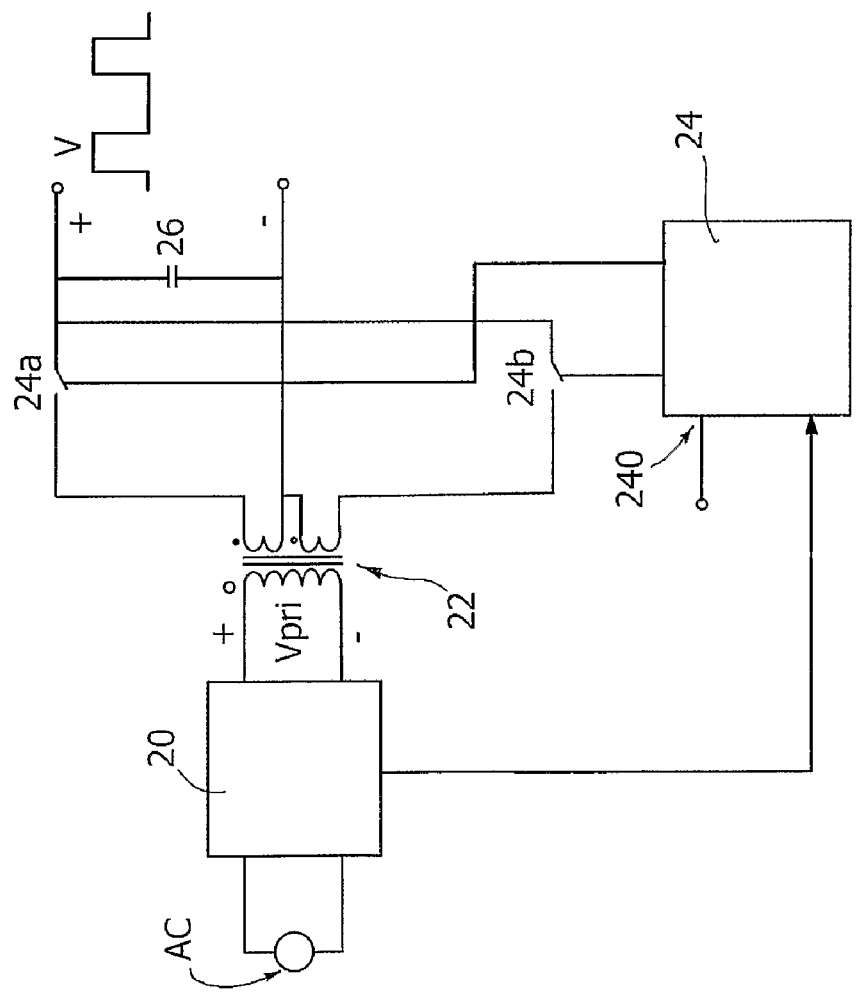
FIG. 3 is a block diagrams diagram representative of exemplary power supply circuitry for use in supplying the circuit illustrated in FIG. 2.

The block diagram of FIG. 3 is representative of an insulated off-line power supply arrangement for supplying the circuit illustrated in FIG. 2 with the bipolar PWM voltage v exemplified in FIG. 1.

The power supply of FIG. 3 is currently fed from standard AC mains voltage (i.e. 220 Volts, 50 Hz in EU countries). This input voltage is fed into a full-bridge (FB) or half-bridge (HB) inverter 20 to obtain a high frequency (e.g. 50÷100 kHz) alternate voltage Vpri which is in turn applied to the primary side of a transformer 22.

At the secondary side of the transformer 22, which is a two-secondary transformer, two controlled bidirectional switches 24a, 24b (typically in the form of semiconductor switches such as a pair of MOSFETs) act as active rectifiers under the control of a control circuit 24 to produce the desired bipolar PWM voltage v across an output capacitor 26.

Specifically, the two switches 24a, 24b connect the two secondary windings of the transformer 22 to the output capacitor 26 by operating as follows:

i) if a positive output voltage v is required (i.e. v=+Vcc), when the voltage Vpri is positive, the switch 24a is "on" (i.e. conducting) and the switch 24b is "off" (i.e. non conducting); when Vpri is negative the switch 24a is "off" and the switch 24b is "on";

ii) conversely, if a negative output voltage v is required (i.e. v=−Vcc), when the voltage Vpri is positive, the switch 24a is "off" and the switch 24b is "on"; when Vpri is negative the switch 24a is "on" and the switch 24b is "off".

A synchronization signal linked to the output voltage Vpri is derived from the inverter 20 and fed to the control circuitry 24. The control circuit 24 is thus synchronized with the primary switching frequency of the transformer 22 and avoids undesired cross-conduction of the switches 24a, 24b.

An input line 240 to the control circuit 24 permits to vary (in manner known per se) the lengths of the periods of time over which the two switches 24a, 24b are conductive and non-conductive and thus to control the lengths of the LEDs on/LEDs off intervals in the bipolar voltage v input to the circuit of FIG. 2.

The resulting PWM modulation of the signal v makes it possible to dim the high flux LED module while avoiding the drawbacks highlighted in the introductory portion of the description while ensuring the proper power supply of the ancillary circuits 12 also at low dimming levels.

It will be appreciated that the details and the embodiments of the invention may vary, even appreciably, with reference to what has been described above by way of example only, without departing from the scope of the invention as defined in the following claims.

The invention claimed is:

1. A circuit for supplying a light source with Pulse Width Modulation (PWM) dimming capability, the circuit comprising:

a rectifier for receiving an input bipolar PWM modulated signal representative of a desired dimming level for said light source and produce therefrom a rectified signal, the input bipolar PWM modulated signal being a signal that alternates between first and second voltages of opposite signs, the first voltage defining an on time and the second voltage defining an off time;

a current regulator arranged to receive said rectified signal and produce therefrom a supply current for said light source such that the light source is driven only during the on-time;

a control module sensitive to said input bipolar PWM modulated signal to control said current regulator to produce a PWM modulated supply current for said light source; and a capacitor arranged between said rectifier and said current regulator to stabilize said rectified signal.

2. The circuit of claim 1, further comprising ancillary circuitry connected to said capacitor to be supplied with said rectified signal as stabilized by said capacitor, whereby said ancillary circuitry is supplied irrespective of the dimming level associated with said input bipolar PWM modulated signal.

3. The circuit of claim 1, wherein said rectifier receives an input bipolar PWM modulated voltage signal and produces therefrom a rectified signal.

4. The circuit of claim 1, comprising a generator of said input bipolar PWM modulated signal.

5. The circuit of claim 4, wherein said generator of said input bipolar PWM modulated signal includes:

an AC supplied inverter, a transformer having a primary winding connected to said AC supplied inverter and two secondary windings, an output capacitor to be charged via said two secondary windings of said transformer, two switches switchable in a manner synchronized with the primary switching frequency of said transformer to alternatively connect said output capacitor to said secondary windings of said transformer, and a control circuit to control switching of said switches as a function of an imposed dimming level, whereby said input bipolar PWM modulated signal is charged on said output capacitor.

6. The circuit of claim 5, wherein said switches are bidirectional semiconductor switches.

7. The circuit of claim 1, comprising said light source.

8. The circuit of claim 1, wherein said light source includes at least one LED.

9. A method of supplying a light source with Pulse Width Modulation (PWM) dimming capability, the method comprising the steps of:

generating an input bipolar PWM modulated signal, the PWM modulation being representative of a desired dimming level of said light source, the input bipolar PWM modulated signal being a signal that alternates between first and second voltages of opposite signs, the first voltage defining an on time and the second voltage defining an off time;

rectifying, by a rectifier, said input bipolar PWM modulated signal to produce thereby a rectified signal;

sensing said input bipolar PWM modulated signal and producing from said rectified signal a PWM modulated supply current for said light source such that the light source is driven only during the on-time; and providing a stabilizer element to stabilize said rectified signal, whereby said stabilized rectified signal is independent of the dimming level associated with said input bipolar PWM modulated signal.

10. The circuit of claim 6, wherein said bidirectional semiconductor switches are pairs of MOSFETs.

11. A circuit for supplying a light source with Pulse Width Modulation (PWM) dimming capability, the circuit comprising:
a rectifier for receiving an input bipolar PWM modulated signal representative of a desired dimming level for said source and produce therefrom a rectified signal;
a current regulator to receive said rectified signal and produce therefrom a supply current for said light source;
a control module sensitive to said input bipolar PWM modulated signal to control said current regulator to produce a PWM modulated supply current for said light source; and
a capacitor arranged between said rectifier and said current regulator to stabilize said rectified signal; and
a generator configured to generate the input bipolar PWM modulated signal comprising:
an AC supplied inverter,
a transformer having a primary winding connected to said AC supplied inverter and two secondary windings,
an output capacitor to be charged via said two secondary windings of said transformer,
two switches switchable in a manner synchronized with the primary switching frequency of said transformer to alternatively connect said output capacitor to said secondary windings of said transformer, and
a control circuit to control switching of said switches as a function of an imposed dimming level, whereby said input bipolar PWM modulated signal is charged on said output capacitor.

12. The circuit of claim 11, wherein said switches are bidirectional semiconductor switches.

13. The circuit of claim 12, wherein said bidirectional semiconductor switches are pairs of MOSFETs.

* * * * *